(12) United States Patent
Rajagopal et al.

(10) Patent No.: US 10,164,914 B2
(45) Date of Patent: Dec. 25, 2018

(54) NETWORK FUNCTION VIRTUALIZATION (NFV) SOFTWARE-DEFINED NETWORK (SDN) NETWORK-TO-NETWORK INTERFACES (NNIS)

(71) Applicant: Sprint Communications Company L.P., Overland Park, KS (US)

(72) Inventors: Arun Rajagopal, Leawood, KS (US); Marouane Balmakhtar, Alexandria, VA (US); Lyle Walter Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 120 days.

(21) Appl. No.: 15/352,969

(22) Filed: Nov. 16, 2016

(65) Prior Publication Data
US 2018/0139154 A1 May 17, 2018

(51) Int. Cl.
*H04L 12/931* (2013.01)
*H04L 12/24* (2006.01)

(52) U.S. Cl.
CPC ............ *H04L 49/354* (2013.01); *H04L 41/04* (2013.01); *H04L 41/12* (2013.01); *H04L 41/22* (2013.01)

(58) Field of Classification Search
CPC ......... H04L 41/22; H04L 41/12; H04L 41/04; H04L 49/354
See application file for complete search history.

(56) References Cited

U.S. PATENT DOCUMENTS

| 9,167,501 B2 | 10/2015 | Kempf et al. |
| 2014/0201374 A1 | 7/2014 | Ashwood-Smith et al. |
| 2014/0317293 A1 | 10/2014 | Shatzkamer |

(Continued)

FOREIGN PATENT DOCUMENTS

WO 2015170204 11/2015

OTHER PUBLICATIONS

"Network Functions Virtualisation (NFV); Ecosystem; Report on SDN Usage in NFV Architectural Framework;" ETSI Group Specification; Dec. 2015; pp. 1-125; NFV-EVE 005 V1.1.1; Sophia-Antipolis, France.

(Continued)

*Primary Examiner* — Kevin C. Harper
*Assistant Examiner* — Henry Baron

(57) ABSTRACT

A Network Function Virtualization (NFV) Software-Defined Network (SDN) communicates across network boundaries with other NFV SDNs to support a data communication service. An NFV orchestrator transfers forwarding graphs for service, NFV, and SDN Network-to-Network Interfaces (NNIs) to an SDN controller. The SDN controller converts the forwarding graphs into forwarding instructions and transfers the forwarding instructions for the service, NFV, and SDN NNIs to an NFV SDN switching system. The NFV orchestrator uses the NFV NNI to transfer its forwarding graphs over the NFV SDN switching system across the network boundary to another NFV orchestrator. The SDN controller uses the SDN NNI to transfer its forwarding instructions over the NFV SDN switching system across the network boundary to another SDN controller. The NFV SDN switching system uses the service NNI to transfer user data across the network boundary to another NFV SDN switching system.

20 Claims, 6 Drawing Sheets

(56) References Cited

U.S. PATENT DOCUMENTS

| | | |
|---|---|---|
| 2016/0006696 A1 | 1/2016 | Donley et al. |
| 2016/0134527 A1* | 5/2016 | Kwak ................... H04L 45/586 |
| | | 370/352 |
| 2016/0212016 A1 | 7/2016 | Vrzic et al. |
| 2016/0212017 A1 | 7/2016 | Li et al. |
| 2016/0219076 A1 | 7/2016 | Paczkowski et al. |
| 2016/0308981 A1 | 10/2016 | Cortes Gomez |
| 2018/0034714 A1* | 2/2018 | Zhang ................. H04L 41/5096 |

OTHER PUBLICATIONS

"Management and orchestration architectural framework;" ESTI; Apr. 30, 2014; 78 pages; ISG-NFV; Sophia-Antipolis, France.

* cited by examiner

NETWORK FUNCTION VIRTUALIZATION (NFV) SOFTWARE-DEFINED NETWORK (SDN) NETWORK-TO-NETWORK INTERFACES (NNIS)

TECHNICAL BACKGROUND

Data communication systems exchange user data for user devices to provide various data communication services. The user devices may be phones, computers, media players, and the like. The data communication services might be media streaming, audio/video conferencing, data messaging, or internet access. Software-Defined Networks (SDNs) have become a popular data communication system to deliver these data communication services.

An SDN has applications, controllers, and data switches. The SDN controllers expose network-level control-plane Application Programming Interfaces (APIs) to the SDN applications. The SDN applications call these SDN controller APIs to implement the data communication services. In a like manner, the SDN data switches expose network-level data-plane APIs to the SDN controllers. The SDN controllers call these SDN data switch APIs to implement the data communication services. The SDN data switches process user data in response to the SDN data switch API calls.

For example, an SDN application may determine that an update to an SDN Flow Descriptor Table (FDT) is required to support a user data communication service. The SDN application calls a controller API with the FDT update. The SDN controller calls a data switch API with the FDT update. The SDN data switch updates its FDT responsive to the data switch API call from the SDN controller. Subsequently, the SDN data switch receives user data packets, matches the packet addresses to an action in the updated FDT, and performs the action on the user data packets. The SDN data switch may forward, drop, or store the user data packets based on the FDT.

Many SDNs execute on Network Function Virtualization (NFV) computer systems. NFV computer systems have Virtual Network Functions (VNFs) that perform like typical communication network elements or portions of these network elements. The VNFs run under the control of a hypervisor or operating system that controls VNF access to NFV hardware (circuitry, memory, communication interfaces). The VNFs communicate with one another and with other systems over NFV virtual Switches (vSWs) implemented by the hypervisor or operating system.

To implement a data communication service, an NFV Management and Orchestration (MANO) system drives the NFV hardware to execute and support the VNFs based on various descriptors for the data communication service. The NFV MANO system may include a service orchestrator that drives the delivery of data communication services based on forwarding graphs. In NFV SDN systems, the VNFs may be SDN applications and SDN controllers. Unfortunately, the data interface between MANO orchestrators in different data communication networks remains rigid and insecure. The data interface between the SDN controllers in different data communication networks also remains rigid and insecure.

TECHNICAL OVERVIEW

A Network Function Virtualization (NFV) Software-Defined Network (SDN) communicates across network boundaries with other NFV SDNs to support a data communication service. An NFV orchestrator transfers forwarding graphs for service, NFV, and SDN Network-to-Network Interfaces (NNIs) to an SDN controller. The SDN controller converts the forwarding graphs into forwarding instructions and transfers the forwarding instructions for the service, NFV, and SDN NNIs to an NFV SDN switching system. The NFV orchestrator uses the NFV NNI to transfer its forwarding graphs over the NFV SDN switching system across the network boundary to another NFV orchestrator. The SDN controller uses the SDN NNI to transfer its forwarding instructions over the NFV SDN switching system across the network boundary to another SDN controller. The NFV SDN switching system uses the service NNI to transfer user data across the network boundary to another NFV SDN switching system.

DETAILED DESCRIPTION

FIGS. 1-4 illustrate Network Function Virtualization (NFV) Software Defined Network (SDN) 110 that communicates across a network boundary with another NFV SDN 120 to support a data communication service. The data communication service might be content streaming, media conferencing, machine communications, internet access, or some other computerized information service.

Figure 1:
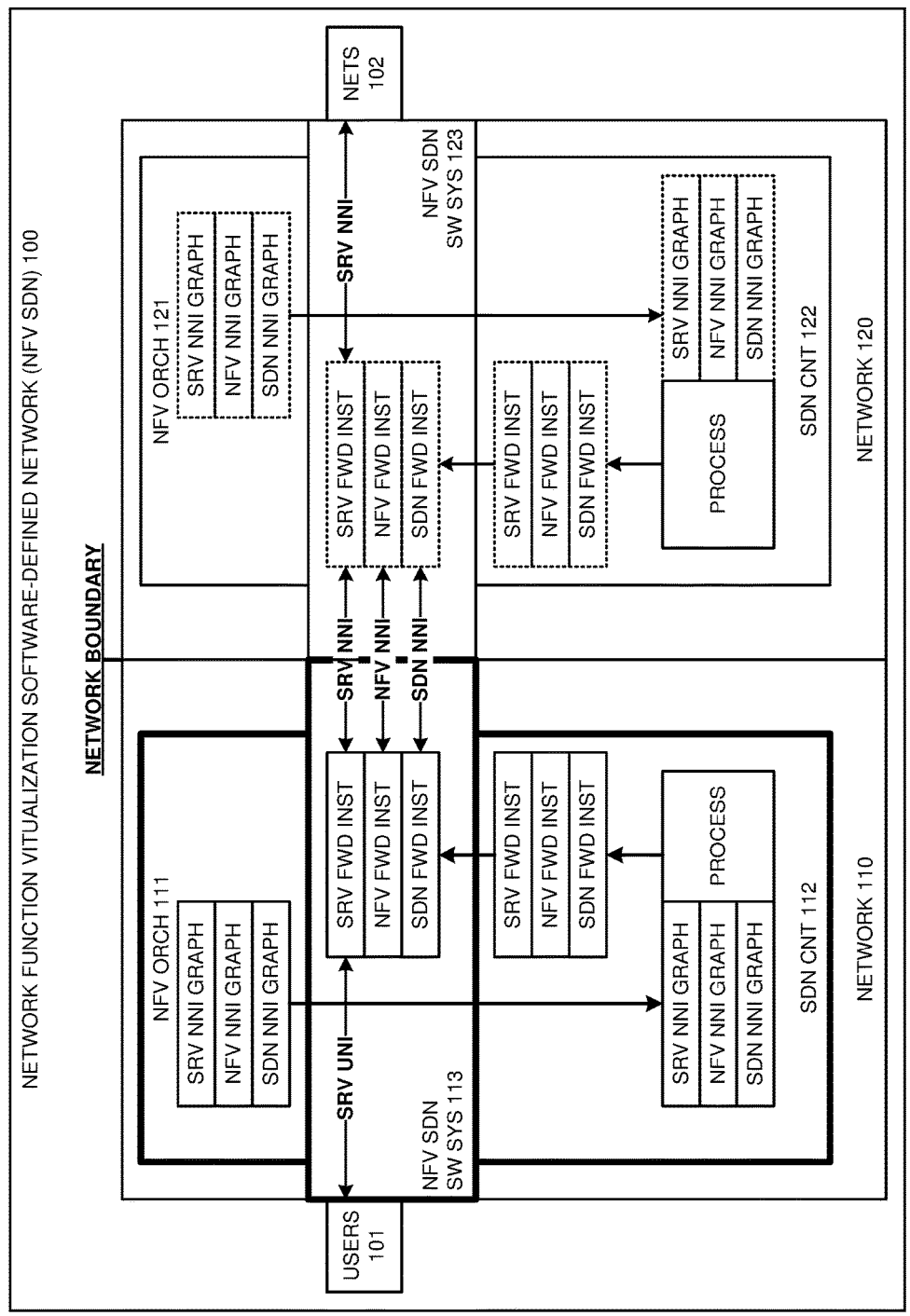
FIGS. 1-4 illustrate a Network Function Virtualization (NFV) Software Defined Network (SDN) that communicates across a network boundary with another NFV SDN to support a data communication service.

Referring to FIG. 1, NFV SDN 100 comprises network 110 and network 120. Network 110 comprises NFV orchestrator (ORCH) 111, SDN controller (CNT) 112, and NFV SDN switching system (SW SYS) 113. Network 120 comprises NFV orchestrator 121, SDN controller 122, and NFV SDN switching system 123. Network 110 and network 120 comprise physically distinct and separate data communication networks. These data communication networks each include their own data servers with circuitry, memories, and transceivers to store and execute operating system and application software.

For example, NFV orchestrator 111 might comprise redundant computer server blades that execute an operating system, a service orchestration application, and a resource orchestration application. SDN controller 112 may comprise an NFV Infrastructure (NFVI) that executes an SDN controller Virtual Network Function (VNF). NFV orchestrator 121 and SDN controller 122 in network 120 would use different server blades and NFVI from orchestrator 111 and SDN controller 112 in network 110 in these scenarios.

NFV SDN switching system 113 comprises physical switches like SDN switches, NFV virtual switches, NFV container switches, Ethernet switches, Internet Protocol (IP) routers, and the like—including combinations thereof. NFV SDN switching system 113 implements forwarding instructions to handle user data, NFV data, and SDN data. The forwarding instructions are received from SDN controller 112.

To deliver the data communication service, NFV orchestrator 111 identifies a service forwarding graph for a service Network-to-Network Interface (NNI)—referred to on FIG. 1 as "SRV NNI GRAPH." For example, NFV orchestrator 111 may receive the service forwarding graph for the service NNI from Operations Support System (OSS). NFV orchestrator 111 transfers the service forwarding graph for the service NNI to SDN controller 112.

SDN controller 112 processes the service forwarding graph for the service NNI to generate service forwarding instructions (SRV FWD INST) for the service NNI. SDN controller 112 may be an Open Daylight platform and the service forwarding instructions may be Open Flow instructions. SDN controller 112 transfers the service forwarding instructions for the service NNI to NFV SDN switching system 113. NFV SDN switching system 113 implements the service forwarding instructions—typically by translating network address data though Flow Descriptor Tables (FDT) into networking tasks and then performing the network tasks. An exemplary network task is routing user data packets out of specified data communication ports.

Users 101 and NFV SDN switching system 113 communicate over a service User-to-Network Interface (UNI). To deliver the data communication service to the end-user, NFV SDN switching system 113 applies the service forwarding instructions to user data between the service UNI and the service NNI to NFV SDN switching system 123.

In a like manner for network 120, NFV orchestrator 121 identifies a service forwarding graph for the service NNI. NFV orchestrator 121 transfers the service forwarding graph for the service NNI to SDN controller 122. SDN controller 122 processes the service forwarding graph for the service NNI to generate service forwarding instructions for the service NNI. SDN controller 122 transfers the service forwarding instructions for the service NNI to NFV SDN switching system 123. NFV SDN switching system 123 implements the service forwarding instructions. Networks 102 and NFV SDN switching system 123 communicate over the service NNI.

To deliver the data communication service to the end-user, NFV SDN switching system 123 applies the service forwarding instructions to the user data for the service NNI between NFV SDN switching system 113 and networks 102. For example, video conference and e-mail data may flow between users 101 and networks 102 based on the service NNI. The service UNI/NNI provide user data communications across network boundaries for the data communication service.

In network 110, NFV orchestrator 111 also identifies an NFV forwarding graph for an NFV NNI—referred to on FIG. 1 as "NFV NNI GRAPH." For example, NFV orchestrator 111 may receive the NFV forwarding graph for the NFV NNI from the OSS. NFV orchestrator 111 transfers the NFV forwarding graph for the NFV NNI to SDN controller 112. SDN controller 112 processes the NFV forwarding graph for the NFV NNI to generate NFV forwarding instructions (NFV FWD INST) for the NFV NNI. SDN controller 112 transfers the NFV forwarding instructions for the NFV NNI to NFV SDN switching system 113. NFV SDN switching system 113 implements the NFV forwarding instructions—typically by translating network address data though FDTs and performing the resulting network tasks. An exemplary network task comprises storing packets. To deliver the data communication service, NFV SDN switching system 113 applies the NFV forwarding instructions for the NFV NNI to NFV data between NFV orchestrator 111 and NFV SDN switching system 123.

In network 110, NFV orchestrator 111 also identifies an SDN forwarding graph for an SDN NNI—referred to on FIG. 1 as "SDN NNI GRAPH." NFV orchestrator 111 may receive the SDN forwarding graph for the SDN NNI from the OSS. NFV orchestrator 111 transfers the SDN forwarding graph for the SDN NNI to SDN controller 112. SDN controller 112 processes the SDN forwarding graph for the SDN NNI to generate SDN forwarding instructions (SDN FWD INST) for the SDN NNI. SDN controller 112 transfers the SDN forwarding instructions for the SDN NNI to NFV SDN switching system 113. NFV SDN switching system 113 implements the SDN forwarding instructions—typically by translating network address data though FDTs and performing the resulting network tasks like forwarding packet headers. To deliver the data communication service, NFV SDN switching system 113 applies the SDN forwarding instructions for the SDN NNI to SDN data between SDN controller 112 and NFV SDN switching system 123.

In network 120, NFV orchestrator 121 also identifies an NFV forwarding graph for the NFV NNI. NFV orchestrator 121 transfers the NFV forwarding graph for the NFV NNI to SDN controller 122. SDN controller 122 processes the NFV forwarding graph for the NFV NNI to generate NFV forwarding instructions for the NFV NNI. SDN controller 122 transfers the NFV forwarding instructions for the NFV NNI to NFV SDN switching system 123. NFV SDN switching system 123 implements the NFV forwarding instructions.

To deliver the data communication service, NFV SDN switching system 123 applies the NFV forwarding instructions for the NFV NNI to the NFV data between NFV orchestrator 121 and NFV SDN switching system 113. Thus, the NFV NNI provides orchestrator to orchestrator communications across network boundaries for the data communication service. For example, NFV orchestrators 111 and 121 may use the NFV NNI to exchange service forwarding graphs for the service NNI across the network boundary.

In network 110, NFV orchestrator 121 also identifies an SDN forwarding graph for the SDN NNI. NFV orchestrator 121 transfers the SDN forwarding graph for the SDN NNI to SDN controller 122. SDN controller 122 processes the SDN forwarding graph for the SDN NNI to generate SDN forwarding instructions for the SDN NNI. SDN controller 122 transfers the SDN forwarding instructions for the SDN NNI to NFV SDN switching system 123. NFV SDN switching system 123 implements the SDN forwarding instructions. To deliver the data communication service, NFV SDN switching system 123 applies the SDN forwarding instructions for the SDN NNI to SDN data between SDN controller 122 and NFV SDN switching system 113. Thus, the SDN NNI provides SDN controller-to-controller communications across network boundaries for the data communication service. For example, SDN controllers 112 and 122 may use SDN NNI to exchange service forwarding instructions for the service NNI across the network boundary.

In some examples, NFV orchestrators 111 and 121 each comprise a service orchestrator and a resource orchestrator. The service orchestrators maintain data like the forwarding graphs, network identifiers, transceiver/port identifiers, and service resource requirements. The resource orchestrators maintain data like available NFVI resources and VNF requirements. The service orchestrators in NFV orchestrators 111 and 121 would share their data (forwarding graphs, network identifiers, transceiver/port identifiers, and service resource requirements) across the network boundary over the NFV NNI. The resource orchestrators could share their data through the service orchestrators over the NFV NNI.

Figure 2:
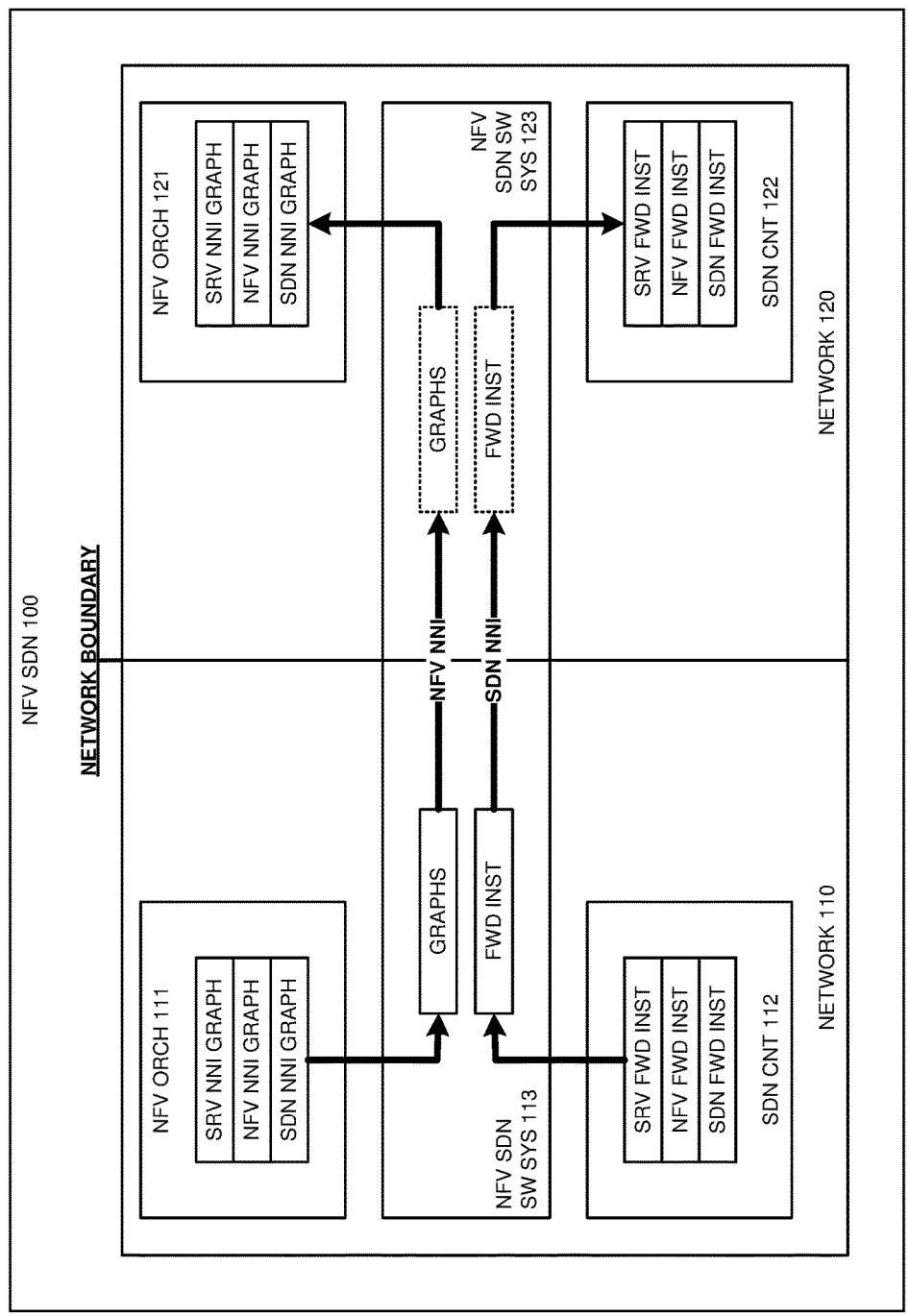

Referring to FIG. 2, a clarified view of NFV SDN 100 is shown. NFV orchestrator 111 stores the service forwarding graph for the service NNI, the NFV forwarding graph for the NFV NNI, and the SDN forwarding graph for the SDN NNI. NFV orchestrator 111 transfers the forwarding graphs to NFV orchestrator 121 over the NFV NNI. SDN controller 112 generates the service forwarding instructions for the service NNI, the NFV forwarding instructions for the NFV NNI, and the SDN forwarding instructions for the SDN NNI. SDN controller 112 transfers the forwarding instructions to SDN controller 122 over the SDN NNI.

In addition to forwarding graphs, NFV orchestrator 111 may identify NFV Service Function Chain (SFC) data for the service NNI. NFV orchestrator 111 may use the NFV NNI to transfer the SFC data to NFV orchestrator 121 across the network boundary. NFV orchestrator 121 may use the NFV NNI to transfer its own SFC data to NFV orchestrator 111 across the network boundary.

Figure 3:
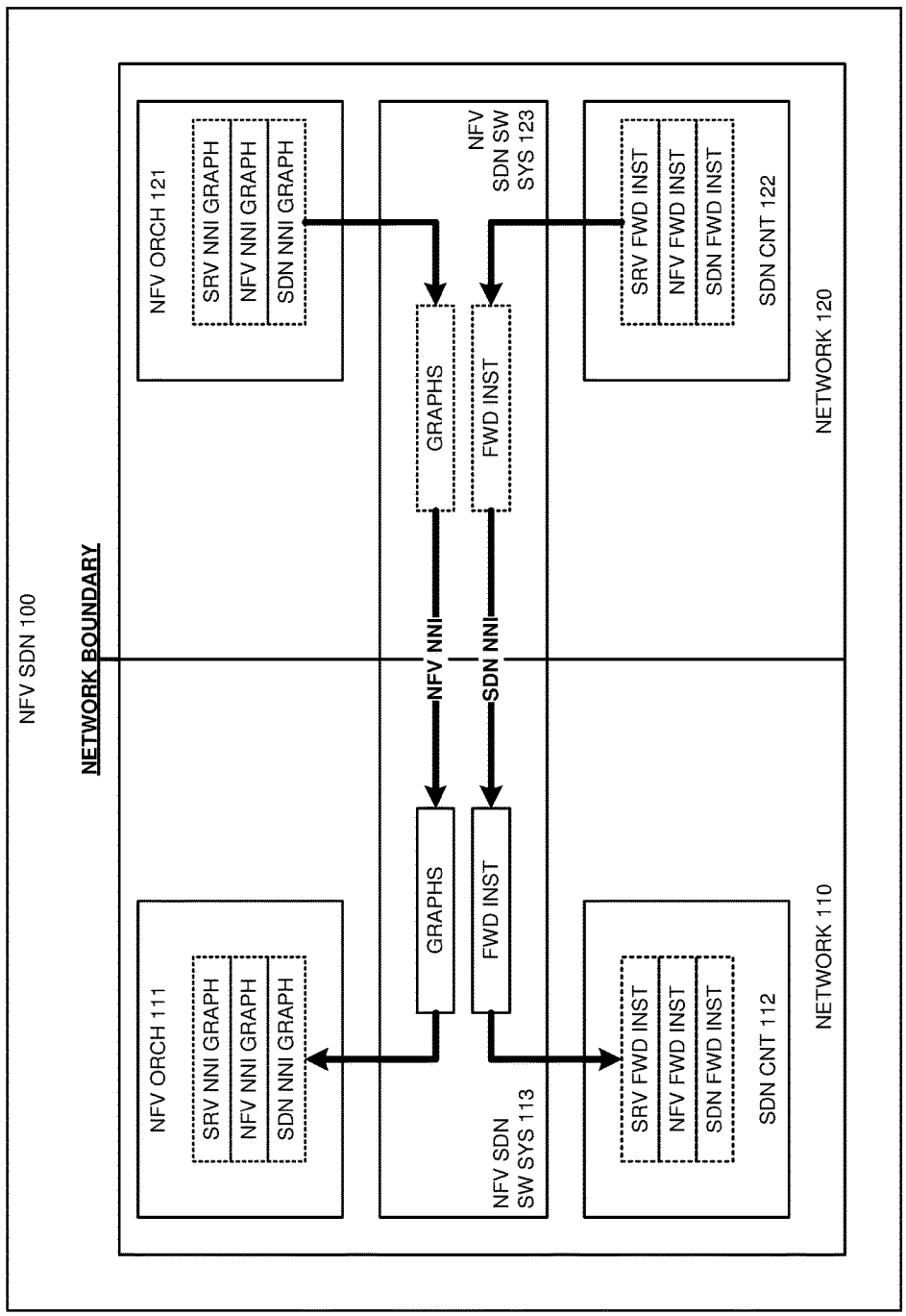

Referring to FIG. 3, another view of NFV SDN 100 is shown. NFV orchestrator 121 stores a service forwarding graph for the service NNI, an NFV forwarding graph for the NFV NNI, and an SDN forwarding graph for the SDN NNI. NFV orchestrator 121 transfers the forwarding graphs to NFV orchestrator 111 over the NFV NNI. SDN controller 122 generates service forwarding instructions for the service NNI, NFV forwarding instructions for the NFV NNI, and SDN forwarding instructions for the SDN NNI. SDN controller 122 transfers the forwarding instructions to SDN controller 112 over the SDN NNI.

Figure 4:
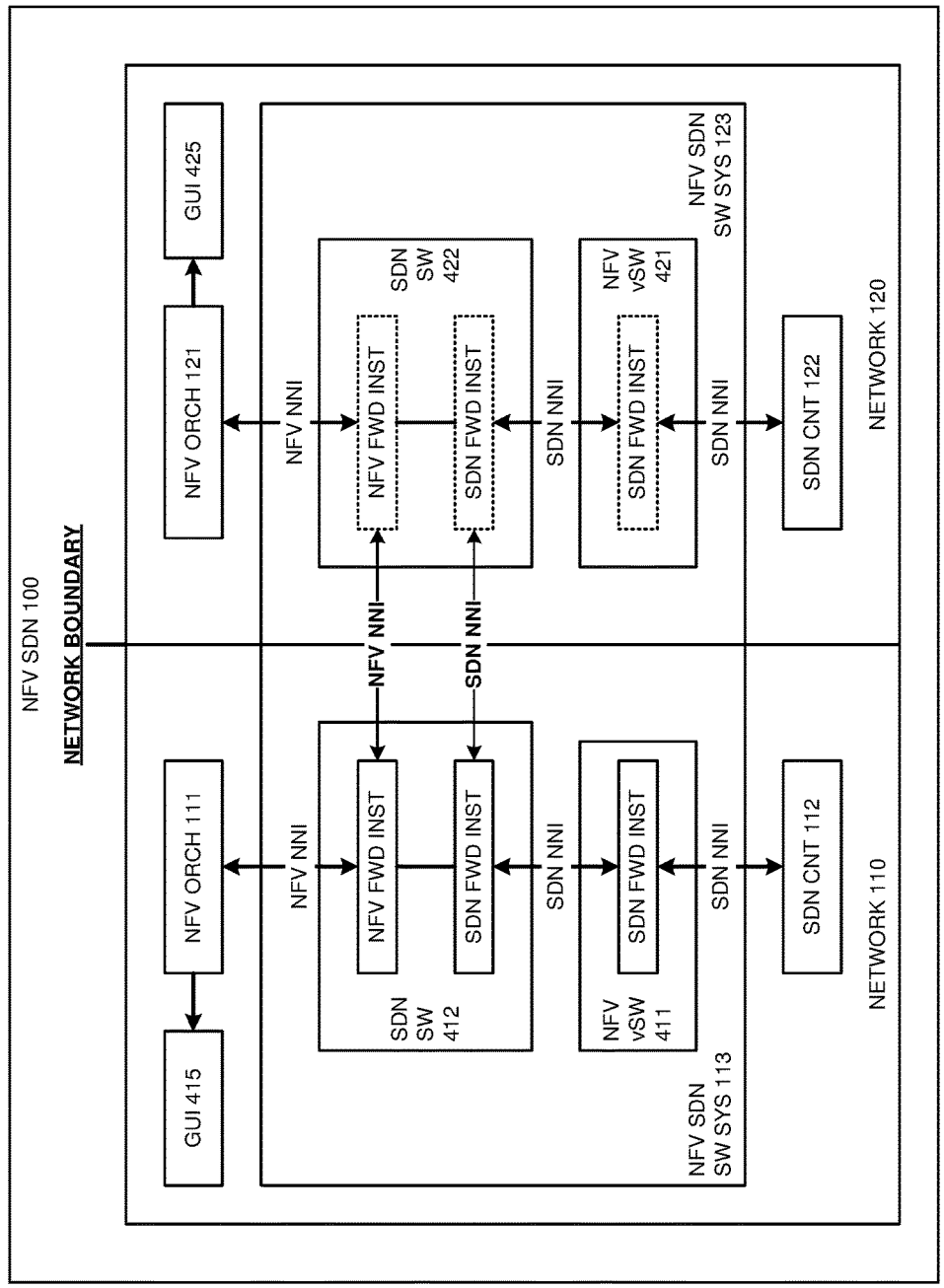

Referring to FIG. 4, an exemplary configuration of NFV SDN switching systems 113 and 123 is shown, although other switching configurations could be used. NFV SDN switching system 113 comprises NFV virtual Switch (vSW) 411 and SDN switch 412. SDN switch 412 comprises a physical data machine that operates under the control of SDN controller 112—perhaps using the Open Flow protocol. NFV vSW 411 comprises a physical switch in the NFV Infrastructure (NFVI) that also operates under the control of SDN controller 112—perhaps using the Open Flow protocol. NFV vSW 412 could be implemented as a module of an NFV hypervisor or operating system.

NFV orchestrators 111 and 121 each comprise computer servers that are coupled to respective SDN switches 412 and 422. The NFV NNI extends between NFV orchestrators 111 and 121 over SDN switches 412 and 422 based on the NFV forwarding instructions from SDN controllers 112 and 122. In this example, SDN controllers 112 and 122 comprise NFV VNFs that are coupled to respective SDN switches 412 and 422 over NFV vSWs 411 and 421. The SDN NNI extends between SDN controllers 112 and 122 over NFV vSWs 411/421 and SDN switches 412/422 based on the SDN forwarding instructions.

In operation, NFV orchestrator 111 and NFV orchestrator 121 exchange forwarding graphs with SDN switches 412 and 422 over the NFV NNI. SDN switches 412 and 422 exchange the forwarding graphs with one another over the NFV NNI based on the NFV forwarding instructions from SDN controllers 112 and 122. SDN controller 112 and SDN controller 122 exchange forwarding instructions with respective NFV vSWs 411 and 412 over the SDN NNI. NFV vSWs 411 and 412 exchange the forwarding instructions with respective SDN switches 412 and 422 over the SDN NNI based on the SDN forwarding instructions. Likewise, SDN switches 412 and 422 exchange the forwarding instructions with one another over the SDN NNI based on the SDN forwarding instructions.

In this example, network 110 includes Graphical User Interface (GUI) 415, and network 120 includes GUI 425. GUIs 415 and 425 comprise computer-controlled visual displays. NFV orchestrator 111 drives GUI 415 to display NFV NNI data like the forwarding graphs received from NFV orchestrator 121. NFV orchestrator 111 also interacts with SDN controller 112 and drives GUI 415 to display SDN NNI data like the forwarding instructions received from SDN controller 122. NFV orchestrator 121 drives GUI 425 to display NFV NNI data like forwarding graphs from NFV orchestrator 111. NFV orchestrator 111 interacts with SDN controller 122 and drives GUI 425 to display SDN NNI data like the forwarding instructions from SDN controller 112.

Figure 5:
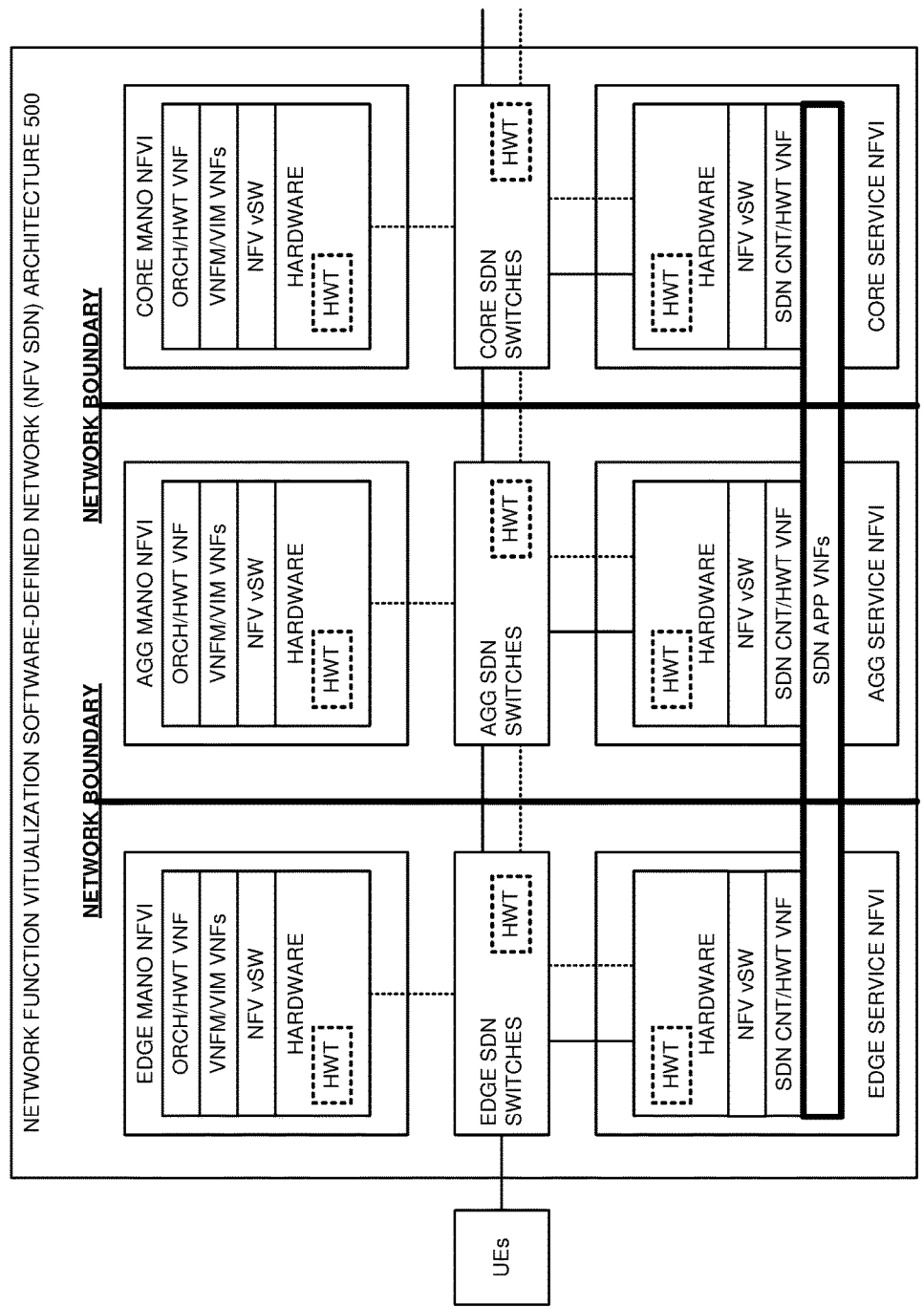
FIG. 5 illustrates an NFV SDN architecture that deploys a service Network-to-Network Interface (NNI), SDN NNI, and NFV NNI across network boundaries for a data communication service.

FIG. 5 illustrates Network Function Virtualization (NFV) Software Defined Network (SDN) architecture 500 that deploys a service Network-to-Network Interface (NNI), SDN NNI, and NFV NNI across network boundaries for a data communication service. NFV SDN 500 is an example of NFV SDN 100, although NFV SDN 100 may use alternative configurations and operations. NFV SDN 500 comprises: User Equipment (UEs), edge SDN switches, aggregation (AGG) SDN switches, core SDN switches, edge service NFVI, aggregation service NFVI, core service NFVI, edge Management and Orchestration (MANO) NFVI, aggregation MANO NFVI, and core MANO NFVI. The NFVIs each comprise data centers having hardware like server blades with CPU cores, data memories, I/O transceivers, and the like.

The service NFVIs execute SDN application Virtual Network Functions (VNFs). Exemplary SDN application VNFs include baseband controllers, modem controllers, internet routers, Ethernet switches, packet network gateways, media servers, policy engines, mobility managers, authorization databases, packet inspectors, internet protocol multimedia subsystem servers, load balancers, firewalls, address translators, and the like. The edge SDN switches may include wireless base station VNFs that drive wireless transceivers to exchange wireless data with the UEs. In this example, the SDN controllers are VNFs in the service NFVIs, but the SDN controllers could be VNFs in the MANO NFVIs, or the SDN controllers could be software applications on some other computer system.

The MANO NFVI hardware executes software to implement NFV vSWs and MANO VNFs for VNF Managers (VNFMs), Virtual Infrastructure Managers (VIMs), orchestrators, and Hardware Trust (HWT) managers. The service NFVI hardware executes software to implement NFV virtual switches (vSWs) and service VNFs for an SDN application (APP), SDN controllers (CNT), and HWT managers. As indicated by the network boundary, the edge NFVIs and edge SDN switches are in a different data communication network from the aggregation NFVIs and aggregation SDN switches. As indicated by the other network boundary, the aggregation NFVIs and aggregation SDN switches are in a different data communication network from the core NFVIs and core SDN switches. A single SDN application comprised of multiple SDN application VNFs may operate across these network boundaries by using a coordinated service NNI, NFV NNI, and SDN NNI. For example, a single video service application may use an SDN application VNF in the edge, aggregation and core NFVIs to control the delivery of video content to the UEs.

The NFVIs execute vSW software to provide connectivity among the VNFs and between the VNFs and external systems. The MANO NFVIs direct the operation of the service NFVIs. Specifically, the orchestration VNFs drive the VNFM and VIM VNFs to on-board and manage the SDN application and controller VNFs in the service NFVIs. The SDN application VNFs control the data communication service for the UEs. The SDN controller VNFs control the NFV vSWs and the SDN switches for the SDN application VNFs. The NFV vSWs and the SDN switches exchange user data for the data communication service.

The orchestration VNFs transfer forwarding graphs for the service NNI, NFV NNI, and SDN NNI to their corresponding SDN controller VNFs. The SDN controller VNFs process the service, NFV, and SDN forwarding graphs to generate service, NFV, and SDN forwarding instructions. The SDN controller VNFs transfer the service, NFV, and SDN forwarding instructions to the NFV vSWs and the SDN switches. The NFV vSWs and the SDN switches implement the service, NFV, and SDN forwarding instructions to provide the service NNI, the NFV NNI, and the SDN NNI.

To set-up a data session, one of the UEs transfers a session request to the edge SDN application VNF. The edge SDN application VNF informs the aggregation SDN application VNF to extend the session. The aggregation SDN application VNF informs core SDN application VNF to extend the session. In the edge, aggregation, and core NFVIs, the SDN application VNFs transfer SDN controller API calls for the UE session to their associated SDN controller VNFs. The SDN controller VNFs transfer NFV vSW switch API calls to the NFV vSWs switches. The SDN controller VNFs also transfer SDN switch API calls through the vSWs to the SDN switches in the edge, aggregation, and core. The SDN switches transfer user data for the UE data service responsive to the API calls based on the service forwarding instructions for the service NNI.

To manage the data session, the edge NFV orchestrator may share its forwarding graphs (service, NFV, and/or SDN) for the data communication service over the NFV NNI with the aggregation orchestrator and the core orchestrator. The aggregation orchestrator and the core orchestrator may share their forwarding graphs in a similar manner. The core SDN controller may share its forwarding instructions (service, NFV, and/or SDN) for the data communication service over the SDN NNI with the aggregation SDN controller and the edge SDN controller. The aggregation SDN controller and the edge SDN controller may share their forwarding instructions in a similar manner.

The SDN switches and NFVI hardware each have a unique and secret physically-embedded and read-only Hardware Trust (HWT) code. For example, the edge service NFVI hardware may comprise server blades and supporting equipment with Central Processing Units (CPUs), Input/Output (I/O) transceivers, Random Access Memory (RAM), and data storage. Each server blade may have a CPU with a unique embedded HWT code. Alternatively, each CPU, transceiver, RAM, and data storage unit may have their own unique embedded HWT codes.

The SDN switches and the NFVI hardware are each configured to receive HWT challenges, such as random numbers, from a HWT control system. HWT controllers in the SDN switches and the NFVI hardware read and hash the random numbers and the secret HWT codes to generate HWT answers. The HWT controllers transfer the HWT answers to the HWT control system. The HWT control system hashes its own copy of the random numbers and the HWT codes to generate the HWT answers. If the received HWT answers match the generated HWT answers, the HWT is maintained. In addition to HWT challenges, the hardware in the SDN switches and the NFVIs may augment the HWT answers with related data for their operating systems and/or hypervisors, virtual switches, VNFs, network identifiers, NFV time cycles, network addresses, and the like.

In this example, each NFVI executes a HWT VNF, and the MANO orchestrator HWT VNF is the HWT control system in each network. The MANO orchestrator HWT VNFs issue HWT challenges to the SDN switches. The SDN switches respond with HWT answers for HWT validation by the MANO orchestrator HWT VNFs. The MANO orchestrator HWT VNFs also issue HWT challenges to the SDN controller HWT VNFs in the service NFVIs. The SDN controller HWT VNFs respond with HWT answers for HWT validation by the MANO orchestrator HWT VNFs.

The MANO orchestrator HWT VNFs may share HWT data over the NFV NNI. The core MANO orchestrator HWT VNF may issue MANO NFVI HWT challenges to the aggregation and edge MANO orchestrator HWT VNFs over the NFV NNI. The core MANO orchestrator HWT VNF validates the MANO NFVI HWT answers. The MANO orchestrator HWT VNFs then issue HWT challenges to their core, aggregation, and edge service NFVIs. The MANO orchestrator HWT VNFs validate the service NFVI HWT answers. The MANO orchestrator HWT VNFs may share their HWT validation and related data for their service NFVIs over the NFV NNI. The SDN controller HWT VNFs may also share HWT data for their service NFVIs over the SDN NNI.

Alternatively, other systems may serve as the HWT control system. The MANO VIM or VNFM may issue and validate HWT challenges. The SDN application or SDN controller VNFs may issue and validate HWT challenges. Other systems may handle the HWT challenges. Instead of the SDN controller VNFs processing the HWT challenges, the VIM, VNFM, SDN application, NFVI operating system, NFVI hypervisor, and/or NFV vSW may process and respond to HWT challenges.

Figure 6:
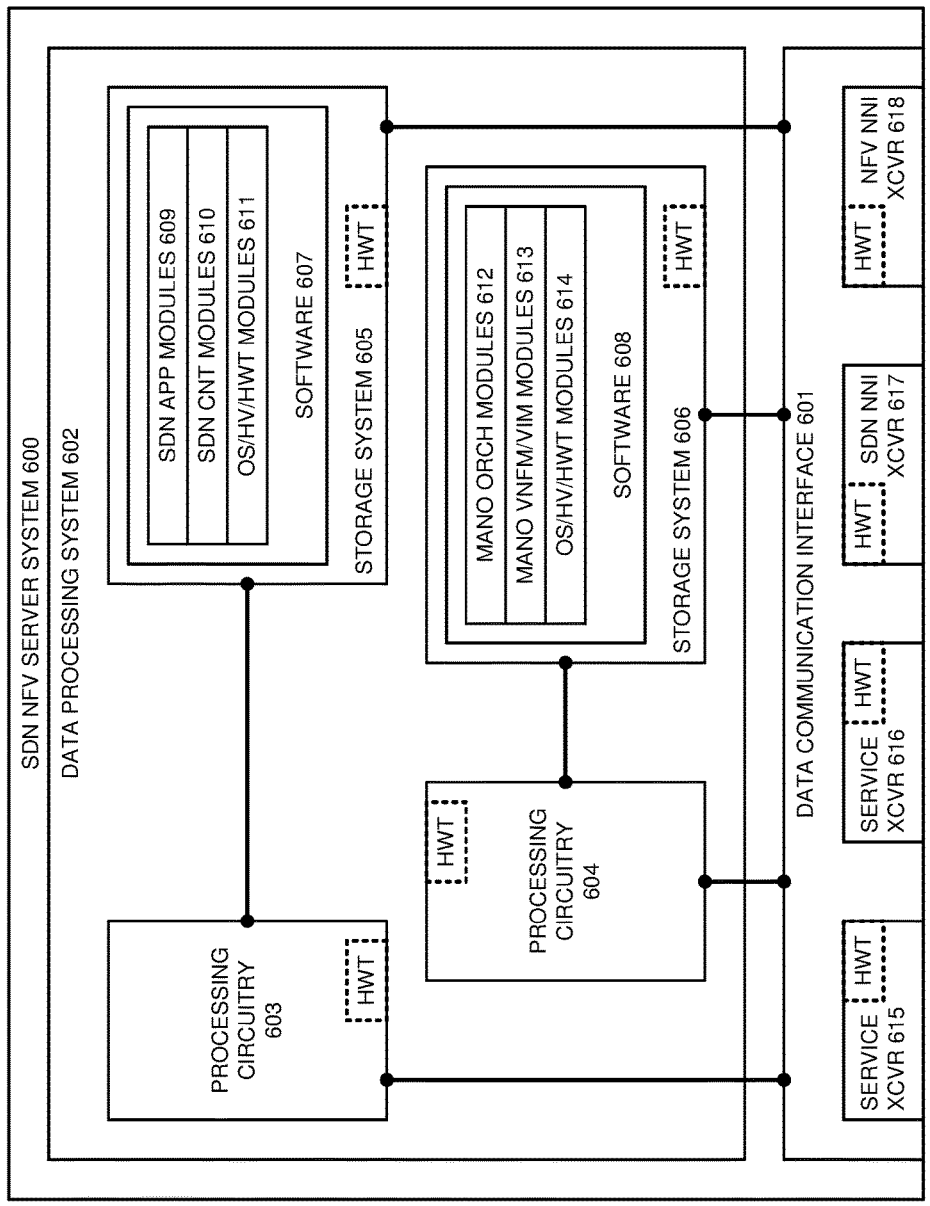
FIG. 6 illustrates a SDN NFV server system that communicates across network boundaries.

FIG. 6 illustrates Software Defined Network (SDN) Network Function Virtualization (NFV) server system 600 that communicates across network boundaries. SDN NFV server system 600 is an example of NFV SDN 100, although NFV SDN 100 may use alternative configurations and operations. SDN NFV server system 600 comprises data communication interface 601 and data processing system 602. Data communication interface 601 comprises data transceivers 615-618. Data processing system 602 comprises processing circuitry 603-604 and storage systems 605-606. Storage systems 605-606 store software 607-608. Software 607-608 includes respective software modules 609-614. Processing circuitry 603-604, storage systems 605-606, and data transceivers 615-618 each have a unique and secret physically-embedded read-only Hardware Trust (HWT) code. SDN NFV server system 600 may be centralized or distributed.

Data machine transceivers 615-618 comprise communication components, such as ports, bus interfaces, signal processors, memory, software, interface cards, and the like. Processing circuitry 603-604 comprises server blades, circuit boards, bus interfaces, integrated circuitry, RAM, and associated electronics. Storage systems 605-606 comprise non-transitory, machine-readable, data storage media, such as RAM, flash drives, disc drives, memory circuitry, data servers, and the like. Software 607-608 comprises machine-readable instructions that control the operation of processing circuitry 603-604 when executed. All or portions of software 609-614 may be externally stored on one or more storage media, such as circuitry, discs, and the like.

When executed by processing circuitry 603, software modules 609-611 direct circuitry 603 to perform the following operations. SDN application modules 609 process user and network data to drive SDN controller modules 610 to deliver data communication services to users. SDN controller modules 610 process the SDN controller API calls to generate SDN switch API calls to drive SDN switches and NFV vSWs to deliver the data communication services to the users. SDN controller modules 610 use SDN NNI transceiver 617 to communicate with external SDN controllers over the SDN NNI.

Operating System (OS)/Hypervisor (HV)/Hardware Trust (HWT) modules 611 support SDN application modules 609 and SDN controller modules 610 with virtual interfaces or containers. OS/HV/HWT modules 611 use service transceivers 615-616 to handle user data for the data communication service. OS/HV/HWT modules 611 handle HWT challenges. Thus, OS/HV/HWT modules 611 may interact with controllers in processing circuitry 603, storage system 605, and data communication interface 601 to access their embedded HWT codes, perform the HWT hashing, and transfer the HWT answers.

When executed by processing circuitry 604, software modules 612-614 direct circuitry 604 to perform the following operations. MANO orchestration modules 612 drive VNFM/VIM modules 613 based on OSS service requirements like service forwarding graphs. MANO orchestration modules 612 use NFV NNI transceiver 618 to communicate with external NFV orchestrators over the NFV NNI. Transceivers 617-618 could be integrated together.

VNFM/VIM modules 613 interact with OS/HV/HWT modules 611 to orchestrate and manage the delivery of the data communication services in the NFVI. OS/HV/HWT modules 614 support MANO orchestration modules 612 and VNFM/VIM modules 613 with virtual interfaces or containers. OS/HV/HWT modules 614 handle HWT challenges. Thus, OS/HV/HWT modules 614 may interact with controllers in processing circuitry 604, storage system 606, and data communication interface 601 to access their embedded HWT codes, perform the HWT hashing, and transfer the HWT answers. OS/HV/HWT modules 614 may also perform the role of HWT control system by issuing HWT challenges and validating HWT answers.

Some conventional aspects of SDN NFV server system 600 are omitted for clarity, such as power supplies, enclosures, and the like. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a Network Function Virtualization (NFV) Software-Defined Network (SDN) to communicate across a network boundary with another NFV SDN to support a data communication service, the method comprising:
   an NFV orchestrator transferring a service forwarding graph for a service Network-to-Network Interface (NNI) to an SDN controller;
   the NFV orchestrator transferring an NFV forwarding graph for an NFV NNI to the SDN controller;
   the NFV orchestrator transferring an SDN forwarding graph for an SDN NNI to the SDN controller;
   the SDN controller processing the service forwarding graph to generate service forwarding instructions and transferring the service forwarding instructions for the service forwarding graph for the service NNI to an NFV SDN switching system;
   the SDN controller processing the NFV forwarding graph to generate NFV forwarding instructions and transferring the transferring NFV forwarding instructions for the NFV forwarding graph for the NFV NNI to the NFV SDN switching system;
   the SDN controller processing the SDN forwarding graph to generate SDN forwarding instructions and transferring the transferring SDN forwarding instructions for the SDN forwarding graph for the SDN NNI to the NFV SDN switching system;
   the NFV orchestrator transferring the service forwarding graph for the service NNI to another NFV orchestrator across the network boundary over the NFV SDN switching system based on the NFV forwarding instructions for the NFV NNI; and
   the SDN controller transferring the service forwarding instructions for the service NNI to another SDN controller across the network boundary over the NFV SDN switching system based on the SDN forwarding instructions for the SDN NNI.

2. The method of claim 1 wherein the NFV SDN switching system comprises an NFV virtual switch and an SDN switch.

3. The method of claim 2 wherein the NFV orchestrator transferring the service forwarding graph to the other NFV orchestrator over the NFV SDN switching system comprises the SDN switch transferring the service forwarding graph across the network boundary based on the NFV forwarding instructions for the NFV NNI.

4. The method of claim 2 wherein the SDN controller transferring the service forwarding instructions to the other SDN controller over the NFV SDN switching system comprises the NFV virtual switch transferring the service forwarding instructions to the SDN switch based on the SDN forwarding instructions for the SDN NNI.

5. The method of claim 4 wherein the SDN controller transferring the service forwarding instructions to the other SDN controller over the NFV SDN switching system comprises the SDN switch transferring the service forwarding instructions across the network boundary based on the SDN forwarding instructions for the SDN NNI.

6. The method of claim 1 further comprising the NFV orchestrator exchanging NFV Service Function Chain (SFC) data for the user NNI with another NFV orchestrator across the network boundary over the NFV SDN switching system based on the NFV forwarding instructions for the NFV NNI.

7. The method of claim 1 further comprising the NFV orchestrator transferring the NFV forwarding graph for the NFV NNI to the other NFV orchestrator across the network boundary over the NFV SDN switching system based on the NFV forwarding instructions for the NFV NNI.

8. The method of claim 1 further comprising the SDN controller transferring the SDN forwarding instructions for the SDN NNI to the other SDN controller across the network boundary over the NFV SDN switching system based on the SDN forwarding instructions for the SDN NNI.

9. The method of claim 1 further comprising:
   the SDN controller receiving other service forwarding instructions for another service forwarding graph for the service NNI, receiving other NFV forwarding instructions for another NFV forwarding graph for the NFV NNI, and receiving other SDN forwarding instructions for another SDN forwarding graph for the SDN NNI from the other SDN controller over the NFV SDN switching system based on the SDN NNI;
   the NFV orchestrator receiving another service forwarding graph for the service NNI, receiving another NFV forwarding graph for the NFV NNI, and receiving another SDN forwarding graph for the SDN NNI from the other NFV orchestrator over the NFV SDN switching system based on the NFV NNI; and the SDN controller transferring the other service forwarding instructions, the other NFV forwarding instructions, and the other SDN forwarding instructions to the NFV orchestrator.

10. The method of claim 9 further comprising the NFV orchestrator driving a Graphical User Interface (GUI) to display the other service forwarding graph and the other service forwarding instructions for the service NNI, to display the other NFV forwarding graph and the other NFV forwarding instructions for the NFV NNI, and to display the other SDN forwarding graph and the other SDN forwarding instructions for the SDN NNI.

11. A Network Function Virtualization (NFV) Software-Defined Network (SDN) to communicate across a network boundary with another NFV SDN to support a data communication service, the NFV SDN comprising:

an NFV orchestrator configured to transfer a service forwarding graph for a service Network-to-Network Interface (NNI) to an SDN controller, transfer an NFV forwarding graph for an NFV NNI to the SDN controller, and transfer an SDN forwarding graph for an SDN NNI to the SDN controller;

the SDN controller configured to process the service forwarding graph to generate service forwarding instructions, process the NFV forwarding graph to generate NFV forwarding instructions, and process the SDN forwarding graph to generate SDN forwarding instructions;

the SDN controller configured to transfer the service forwarding instructions for the service forwarding graph for the service NNI to an NFV SDN switching system, transfer the NFV forwarding instructions for the NFV forwarding graph for the NFV NNI to the NFV SDN switching system, and transfer the SDN forwarding instructions for the SDN forwarding graph for the SDN NNI to the NFV SDN switching system;

the NFV orchestrator configured to transfer the service forwarding graph for the service NNI to another NFV orchestrator across the network boundary over the NFV SDN switching system based on the NFV forwarding instructions for the NFV NNI; and the SDN controller configured to transfer the service forwarding instructions for the service NNI to another SDN controller across the network boundary over the NFV SDN switching system based on the SDN forwarding instructions for the SDN NNI.

12. The NFV SDN of claim 11 wherein the NFV SDN switching system comprises an NFV virtual switch and an SDN switch.

13. The NFV SDN of claim 12 wherein the SDN switch is configured to transfer the service forwarding graph across the network boundary based on the NFV forwarding instructions for the NFV NNI.

14. The NFV SDN of claim 12 wherein the NFV virtual switch is configured to transfer the service forwarding instructions to the SDN switch based on the SDN forwarding instructions for the SDN NNI.

15. The NFV SDN of claim 14 wherein the SDN controller is configured to transfer the service forwarding instructions across the network boundary based on the SDN forwarding instructions for the SDN NNI.

16. The NFV SDN of claim 11 wherein the NFV orchestrator is configured to exchange NFV Service Function Chain (SFC) data for the user NNI with another NFV orchestrator across the network boundary over the NFV SDN switching system based on the NFV forwarding instructions for the NFV NNI.

17. The NFV SDN of claim 11 wherein the NFV orchestrator is configured to transfer the NFV forwarding graph for the NFV NNI to the other NFV orchestrator across the network boundary over the NFV SDN switching system based on the NFV forwarding instructions for the NFV NNI.

18. The NFV SDN of claim 11 wherein the SDN controller is configured to transfer the SDN forwarding instructions for the SDN NNI to the other SDN controller across the network boundary over the NFV SDN switching system based on the SDN forwarding instructions for the SDN NNI.

19. The NFV SDN of claim 11 further comprising:

the SDN controller is configured to receive other service forwarding instructions for another service forwarding graph for the service NNI, other NFV forwarding instructions for another NFV forwarding graph for the NFV NNI, and other SDN forwarding instructions for another SDN forwarding graph for the SDN NNI from the other SDN controller over the NFV SDN switching system based on the SDN NNI;

the NFV orchestrator is configured to receive another service forwarding graph for the service NNI, another NFV forwarding graph for the NFV NNI, and another SDN forwarding graph for the SDN NNI from the other NFV orchestrator over the NFV SDN switching system based on the NFV NNI; and the SDN controller is configured to transfer the other service forwarding instructions, the other NFV forwarding instructions, and the other SDN forwarding instructions to the NFV orchestrator.

20. The NFV SDN of claim 19 wherein the NFV orchestrator is configured to drive a Graphical User Interface (GUI) to display the other service forwarding graph and the other service forwarding instructions for the service NNI, to display the other NFV forwarding graph and the other NFV forwarding instructions for the NFV NNI, and to display the other SDN forwarding graph and the other SDN forwarding instructions for the SDN NNI.

* * * * *